United States Patent
Ghosh et al.

(10) Patent No.: US 12,430,812 B2
(45) Date of Patent: Sep. 30, 2025

(54) TEXT-GUIDED CAMEO GENERATION

(71) Applicant: Snap Inc., Santa Monica, CA (US)

(72) Inventors: Arnab Ghosh, Oxford (GB); Jian Ren, Marina Del Ray, CA (US); Pavel Savchenkov, London (GB); Sergey Tulyakov, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 13 days.

(21) Appl. No.: 17/950,945

(22) Filed: Sep. 22, 2022

(65) Prior Publication Data

US 2024/0104789 A1 Mar. 28, 2024

(51) Int. Cl.
G06T 11/00 (2006.01)
G06F 40/289 (2020.01)
G06F 40/35 (2020.01)
G06V 40/16 (2022.01)

(52) U.S. Cl.
CPC ............ G06T 11/00 (2013.01); G06F 40/289 (2020.01); G06F 40/35 (2020.01); G06V 40/161 (2022.01)

(58) Field of Classification Search
CPC ...................................................... G06T 11/00
See application file for complete search history.

(56) References Cited

U.S. PATENT DOCUMENTS

| | | | |
|---|---|---|---|
| 10,242,477 B1 | 3/2019 | Charlton et al. | |
| 10,432,559 B2 | 10/2019 | Baldwin et al. | |
| 10,467,792 B1 | 11/2019 | Roche et al. | |
| 10,788,900 B1 | 9/2020 | Brendel et al. | |
| 11,468,883 B2 | 10/2022 | Ribas Machado Das Neves et al. | |
| 2002/0194006 A1* | 12/2002 | Challapali | G06T 13/40 704/276 |
| 2003/0050778 A1 | 3/2003 | Nguyen et al. | |
| 2006/0143569 A1 | 6/2006 | Kinsella et al. | |
| 2008/0120258 A1 | 5/2008 | Shin et al. | |
| 2009/0252435 A1* | 10/2009 | Wen | G06V 40/161 382/284 |

(Continued)

FOREIGN PATENT DOCUMENTS

| | | |
|---|---|---|
| CN | 107977928 | 5/2018 |
| CN | 110136216 | 8/2019 |

(Continued)

OTHER PUBLICATIONS

"U.S. Appl. No. 17/820,437, Non Final Office Action mailed Jan. 20, 2023", 21 pgs.

(Continued)

*Primary Examiner* — Shivang I Patel
(74) *Attorney, Agent, or Firm* — Schwegman Lundberg & Woessner, P.A.

(57) ABSTRACT

A method of generating an image for use in a conversation taking place in a messaging application is disclosed. Conversation input text is received from a user of a portable device that includes a display. Model input text is generated from the conversation input text, which is processed with a text-to-image model to generate an image based on the model input text. The coordinates of a face in the image are determined, and the face of the user or another person is added to the image at the location. The final image is displayed on the portable device, and user input is received to transmit the image to a remote recipient.

20 Claims, 8 Drawing Sheets

(56) References Cited

U.S. PATENT DOCUMENTS

| | | | |
|---|---|---|---|
| 2010/0141662 A1* | 6/2010 | Storey | G10L 13/00 |
| | | | 345/473 |
| 2012/0130717 A1 | 5/2012 | Xu et al. | |
| 2015/0100537 A1 | 4/2015 | Grieves et al. | |
| 2016/0092410 A1 | 3/2016 | Martin | |
| 2016/0292148 A1 | 10/2016 | Aley et al. | |
| 2017/0154314 A1 | 6/2017 | Mones et al. | |
| 2017/0300462 A1 | 10/2017 | Cudworth et al. | |
| 2018/0083898 A1* | 3/2018 | Pham | H04L 51/046 |
| 2018/0113587 A1 | 4/2018 | Allen et al. | |
| 2018/0136794 A1 | 5/2018 | Cassidy et al. | |
| 2018/0189822 A1 | 7/2018 | Kulkarni et al. | |
| 2018/0210874 A1 | 7/2018 | Fuxman et al. | |
| 2020/0106728 A1 | 4/2020 | Grantham et al. | |
| 2020/0175061 A1 | 6/2020 | Penta et al. | |
| 2020/0403817 A1 | 12/2020 | Daredia et al. | |
| 2021/0192800 A1 | 6/2021 | Dutta et al. | |
| 2021/0335350 A1 | 10/2021 | Ribas Machado Das Neves et al. | |
| 2021/0385179 A1 | 12/2021 | Heikkinen et al. | |
| 2022/0012929 A1 | 1/2022 | Blackstock et al. | |
| 2022/0019747 A1 | 1/2022 | Guo et al. | |
| 2022/0109646 A1 | 4/2022 | Lakshmipathy | |
| 2022/0284884 A1* | 9/2022 | Tongya | G06F 40/242 |
| 2024/0062008 A1 | 2/2024 | Ghosh et al. | |

FOREIGN PATENT DOCUMENTS

| | | |
|---|---|---|
| CN | 110163220 | 8/2019 |
| CN | 110554782 | 12/2019 |
| CN | 114187405 | 3/2022 |
| KR | 20060125333 | 12/2006 |
| KR | 20200095781 | 8/2020 |
| WO | 2021137942 | 7/2021 |
| WO | 2024039957 | 2/2024 |
| WO | 2024064806 | 3/2024 |

OTHER PUBLICATIONS

"U.S. Appl. No. 17/820,437, Response filed Apr. 19, 2023 to Non Final Office Action mailed Jan. 20, 2023", 11 pgs.
"U.S. Appl. No. 17/820,437, Non Final Office Action mailed Sep. 21, 2023", 20 pgs.
"International Application Serial No. PCT US2023 071003, International Search Report mailed Oct. 6, 2023", 3 pgs.
"International Application Serial No. PCT US2023 071003, Written Opinion mailed Oct. 6, 2023", 4 pgs.
U.S. Appl. No. 17/820,437, filed Aug. 17, 2022, Text-Guided Sticker Generation.
"International Application Serial No. PCT/US2023/074762, International Search Report mailed Jan. 8, 2024", 5 pgs.
"International Application Serial No. PCT/US2023/074762, Written Opinion mailed Jan. 8, 2024", 10 pgs.
"U.S. Appl. No. 17/820,437, Response filed Jan. 22, 2024 to Non Final Office Action mailed Sep. 21, 2023", 11 pgs.
"U.S. Appl. No. 17/820,437, Final Office Action mailed Feb. 23, 2024", 14 pgs.
Wang, Xingyao, "An animated picture says at least a thousand words: Selecting Gif-based Replies in Multimodal Dialog", arxiv.org, Cornell University Library, 201 Olin Library Cornell University Ithaca, NY 14853, (Sep. 24, 2021), 30 pgs.
"U.S. Appl. No. 17/820,437, Response filed Apr. 23, 2024 to Final Office Action mailed Feb. 23, 2024", 11 pgs.
"U.S. Appl. No. 17/820,437, Advisory Action mailed May 10, 2024", 5 pgs.
"U.S. Appl. No. 17/820,437, Response filed May 23, 2024 to Advisory Action mailed May 10, 2024", 11 pgs.
Brown, Tom B, et al., "Language Models are Few-Shot Learners", arXiv:2005.14165v4 [cs.CL], (75 pgs), Jul. 22, 2020.
Crowson, Katherine, et al., "VQGAN-CLIP: Open Domain Image Generation and Editing with Natural Language Guidance", arXiv:2204.08583 [cs.CV], (Apr. 18, 2022), 31 pgs.
Esser, Patrick, et al., "Taming Transformers for High-Resolution Image Synthesis", arXiv:2012.09841v3 [cs.CV], (Jun. 23, 2021), 52 pgs.
Li, Junnan, et al., "BLIP: Bootstrapping Language-Image Pre-training for Unified Vision-Language Understanding and Generation", arXiv: 2201.12086v2 [cs.CV], (Feb. 15, 2022), 12 pgs.
Radford, Alec, et al., "CLIP: Connecting Text and Images", OpenAI Blog, [Online] Retrieved from the Internet: <URL: https://openai.com/blog/clip/>, [Retrieved on Jul. 22, 2022], (Jan. 15, 2021), 16 pgs.
Radford, Alec, et al., "Learning Transferable Visual Models From Natural Language Supervision", arXiv:2103.00020v1 [cs.CV], (Feb. 26, 2021), 48 pgs.
Rombach, Robin, et al., "High-Resolution Image Synthesis with Latent Diffusion Models", arXiv:2112.10752v2 [cs.CV], (Apr. 13, 2022), 45 pgs.
Stanton, William, "How to Do Cameos in Snapchat", https://www.alphr.com/snapchat-cameos/, (Jul. 1, 2021).
Vougioukas, Konstantinos, et al., "End-to-End Speech-Driven Facial Animation with Temporal GANs", arXiv:1805.09313v4 [eess.AS], (Jul. 19, 2018), 14 pgs.
Navali, et al., "Sentence Generation Using Selective Text Prediction", Comp, y Sist. vol. 23 No.3 Ciudad de MA©xico Jul./Sep, [Online] Retrieved from the internet: <https://doi.org/10.13053/cys-23-3-3252>, (2019), 8 pgs.
Ying, Hua Tan, et al., "Phrase-based image caption generator with hierarchical LSTM network", Neurocomputing, vol. 333, ISSN 0925-2312, [Online] Retrieved from the internet: <https://doi.Org/10.1016/j.neucom.2018.12.026>, (2019), 86-100.

* cited by examiner

TEXT-GUIDED CAMEO GENERATION

TECHNICAL FIELD

The present disclosure relates generally to the field of messaging, including but not limited to text messaging.

BACKGROUND

Electronic text messages can be enhanced with related images, such as emoji, ideograms, and static or looping gifs to communicate more visually and emotionally. In some instances, an image of a user's face can be included in the image, to provide personalization thereof.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
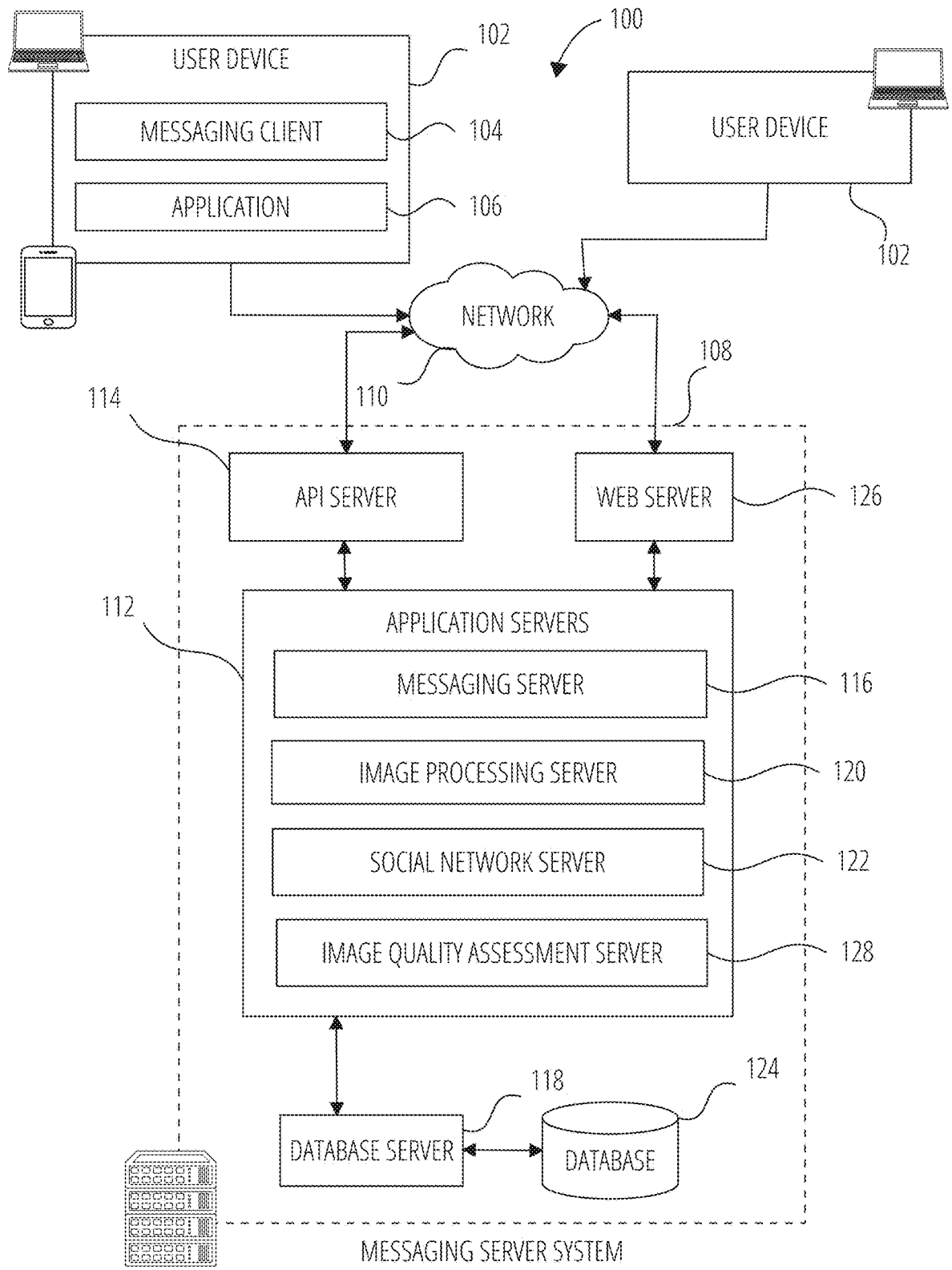
FIG. 1 is a block diagram showing an example messaging system for exchanging data (e.g., messages and associated content) over a network.

The popular Snapchat application by Snap Inc. permits the enhancement of photos, videos and text messages with so-called "stickers," which are graphical elements that can be applied like a label to a photo or video, or included in or over a messaging conversation. The stickers may be playful, including cartoon-like items (such as birthday cakes, champagne bottles, animals and so forth), representations of human figures, which may or may not be an avatar of the user or one of their friends, and decorative text.

In some examples, an image of the face of a user of a messaging system or a portable device, is included in the sticker, to provide what is known as a cameo. Cameos provide a personalized sticker experience for the user to interact with their friends. Cameos may take the form of a sticker with the main character performing some action. The image of the face may be animated to provide expression changes that may be predetermined, recorded, or live. In some examples, the image of the user's face is animated based on the sentiments of the text inputted by the user into the messaging application.

Disclosed herein is a machine learning framework that can generate a cameo image from a text query provided by the user of a messaging application. The framework includes two aspects. Firstly, a text-analyzing system that identifies the important phrases from the user's text query, and an image generation system that uses the imported phrases obtained from the text analyzing system for cameo image generation.

The image generation system has two components. Firstly, one or more background images and associated metadata, including face location data are generated. Secondly, by using the face location information stored in the metadata, the image generation system combines the image of the user's face and a background image generated from the first stage into a complete image. As a final step, the user's face may be animated based on the sentiments of the user's input phrases.

Also disclosed is a method and system of generating a machine learning model for use in the image generation system.

In some examples, provided is a computer-implemented method of generating an image including an existing representation of a face of a person, for use in a conversation taking place in a messaging application. The method includes receiving conversation input text from a user of a portable device that includes a display, generating model input text from the conversation input text, providing the model input text to a text-to-image model to generate an image based on the model input text, determining coordinates of a face in the image, applying the existing representation of the face of the person to the image based on the coordinates of the face in the image, to generate an updated image, displaying the updated image on the display of the portable device, receiving user input to transmit the updated image in a message, and transmitting, in response to receiving the user input, the image to a remote recipient.

The generation of the model input text may include generating additional text using a creative caption function, and include extracting key phrases from the additional text. The method may further include processing the conversation input text with a safety filter to determine suitability of the conversation input text for image generation.

The text-to-image model may have been generated from a large scale image dataset and refined by an existing collection of images for use in a conversation taking place in a messaging application. Text associated with images in the existing collection of images may be expanded using an image-to-text module. The method may also include further include animating the face of the person in the updated image.

In some examples, provided is a non-transitory computer-readable storage medium, the computer-readable storage medium including instructions that when executed by a computer, cause the computer to perform operations for generating an image including an existing representation of a face of a person, for use in a conversation taking place in a messaging application, the operations including the method steps and limitations set forth above, including but not limited to receiving conversation input text from a user of a portable device that includes a display, generating model input text from the conversation input text, providing the model input text to a text-to-image model to generate an image based on the model input text, determining coordinates of a face in the image, applying the existing representation of the face of the person to the image based on the coordinates of the face in the image, to generate an updated image, displaying the updated image on the display of the portable device, receiving user input to transmit the updated image in a message, and transmitting, in response to receiving the user input, the image to a remote recipient.

In some examples, provided is a computing apparatus includes a processor and a memory storing instructions that, when executed by the processor, configure the apparatus to perform operations for generating an image including an existing representation of a face of a person, for use in a conversation taking place in a messaging application, the operations including the method steps and limitations set forth above, including but not limited to receiving conversation input text from a user of a portable device that includes a display, generating model input text from the conversation input text, providing the model input text to a text-to-image model to generate an image based on the model input text, determining coordinates of a face in the image, applying the existing representation of the face of the person to the image based on the coordinates of the face in the image, to generate an updated image, displaying the updated image on the display of the portable device, receiving user input to transmit the updated image in a message, and transmitting, in response to receiving the user input, the image to a remote recipient.

Other technical features may be readily apparent to one skilled in the art from the following figures, descriptions, and claims.

Networked Computing Environment

FIG. 1 is a block diagram showing an example messaging system 100 for exchanging data (e.g., messages and associated content) over a network. The messaging system 100 includes multiple instances of a user device 102, each of which hosts a number of applications, including a messaging client 104 and other applications 106.

Each messaging client 104 is communicatively coupled to other instances of the messaging client 104 (e.g., hosted on respective other user devices 102) and a messaging server system 108 via a network 110 (e.g., the Internet). A messaging client 104 can also communicate with locally-hosted applications 106 using Application Program Interfaces (APIs). The messaging system 100 also includes one or more user device 102, which are communicatively coupled to the messaging server system 108 via the network 110.

As used herein, the term messaging client 104 and messaging system 100 are deemed to include instant messaging platforms, social media platforms, content-sharing platforms, and other platforms in which a user forwards images to other users or posts images onto the platform.

A messaging client 104 is able to communicate and exchange data with other messaging clients 104 and with the messaging server system 108 via the network 110. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 110 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a user device 102 has sufficient processing capacity.

The messaging server system 108 supports various services and operations that are provided to the messaging client 104. Such operations include transmitting data to, receiving data from, and processing data generated by the messaging client 104. This data may include message content, user device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 114 is coupled to, and provides a programmatic interface to, application servers 112. The application servers 112 are communicatively coupled to a database server 118, which facilitates access to a database 124 that stores data associated with messages processed by the application servers 112. Similarly, a web server 126 is coupled to the application servers 112, and provides web-based interfaces to the application servers 112. To this end, the web server 126 processes incoming network requests over the Hypertext Transfer Protocol (HTTP) and several other related protocols.

The Application Program Interface (API) server 114 receives and transmits message data (e.g., commands and message payloads) between the user device 102 and the application servers 112. Specifically, the Application Program Interface (API) server 114 provides a set of interfaces (e.g., routines and protocols) that can be called or queried by the messaging client 104 in order to invoke functionality of the application servers 112. The Application Program Interface (API) server 114 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 116, and for possible access by another messaging client 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 116, an image processing server 120, and a social network server 122. The messaging server 116 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 116, in view of the hardware requirements for such processing.

The application servers 112 also include an image processing server 120 that is dedicated to performing various image processing operations, typically with respect to images or video within the payload of a message sent from or received at the messaging server 116.

The social network server 122 supports various social networking functions and services and makes these functions and services available to the messaging server 116. To this end, the social network server 122 maintains and accesses an entity graph within the database 124. Examples of functions and services supported by the social network server 122 include the identification of other users of the messaging system 100 with which a particular user has relationships or is "following," and also the identification of other entities and interests of a particular user.

The messaging client 104 can notify a user of the user device 102, or other users related to such a user (e.g., "friends"), of activity taking place in one or more external resources, for example games or slimmed down versions of third party applications. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging system 100 in the illustrated example includes an image quality assessment server 128 as part of messaging server system 108, although image quality assessment server 128 may alternatively be provided as part of a separate server system. The image quality assessment server 128 receives image quality assessment results and the related data transmitted from the user devices 102, and performs analysis and data mining on the cumulative image quality assessment results to generate image-quality insights.

System Architecture

Figure 2:
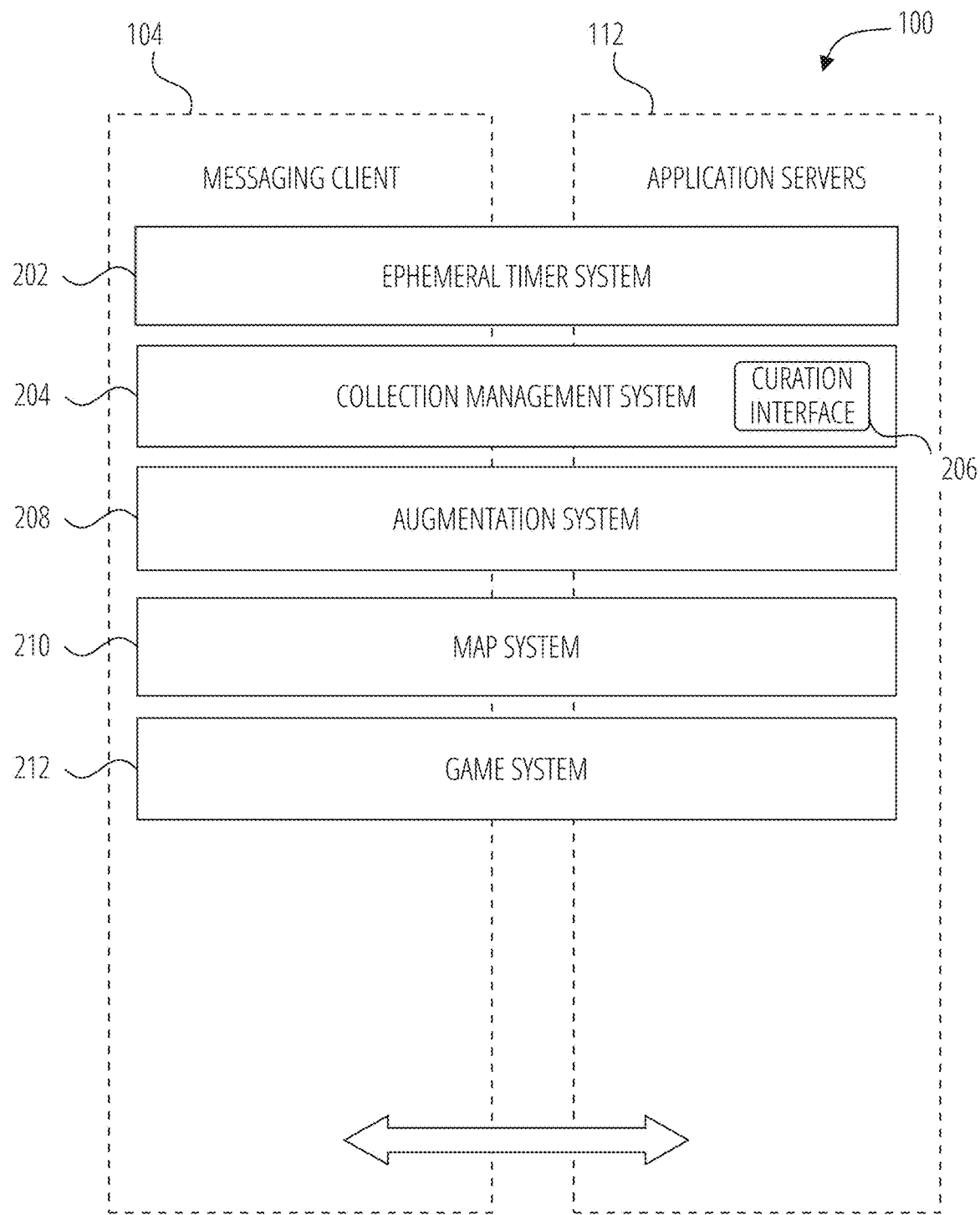
FIG. 2 is a block diagram illustrating further details regarding the messaging system, according to some examples.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 208, a map system 210, and a game system 212.

The ephemeral timer system 202 is responsible for enforcing the temporary or time-limited access to content by the messaging client 104 and the messaging server 116. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the user device 102. In another example, the augmentation system 208 operatively supplies a media overlay to the messaging client 104 based on other information, such as social network information of the user of the user device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text or image that can be overlaid on top of a photograph taken by the user device 102. In another example, the media overlay includes an identification of a location overlay (e.g., Venice beach), a name of a live event, or a name of a merchant overlay (e.g., Beach Coffee House). In another example, the augmentation system 208 uses the geolocation of the user device 102 to identify a media overlay that includes the name of a merchant at the geolocation of the user device 102. The media overlay may include other indicia associated with the merchant. The media overlays may be stored in the database 124 and accessed through the database server 118.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 3:
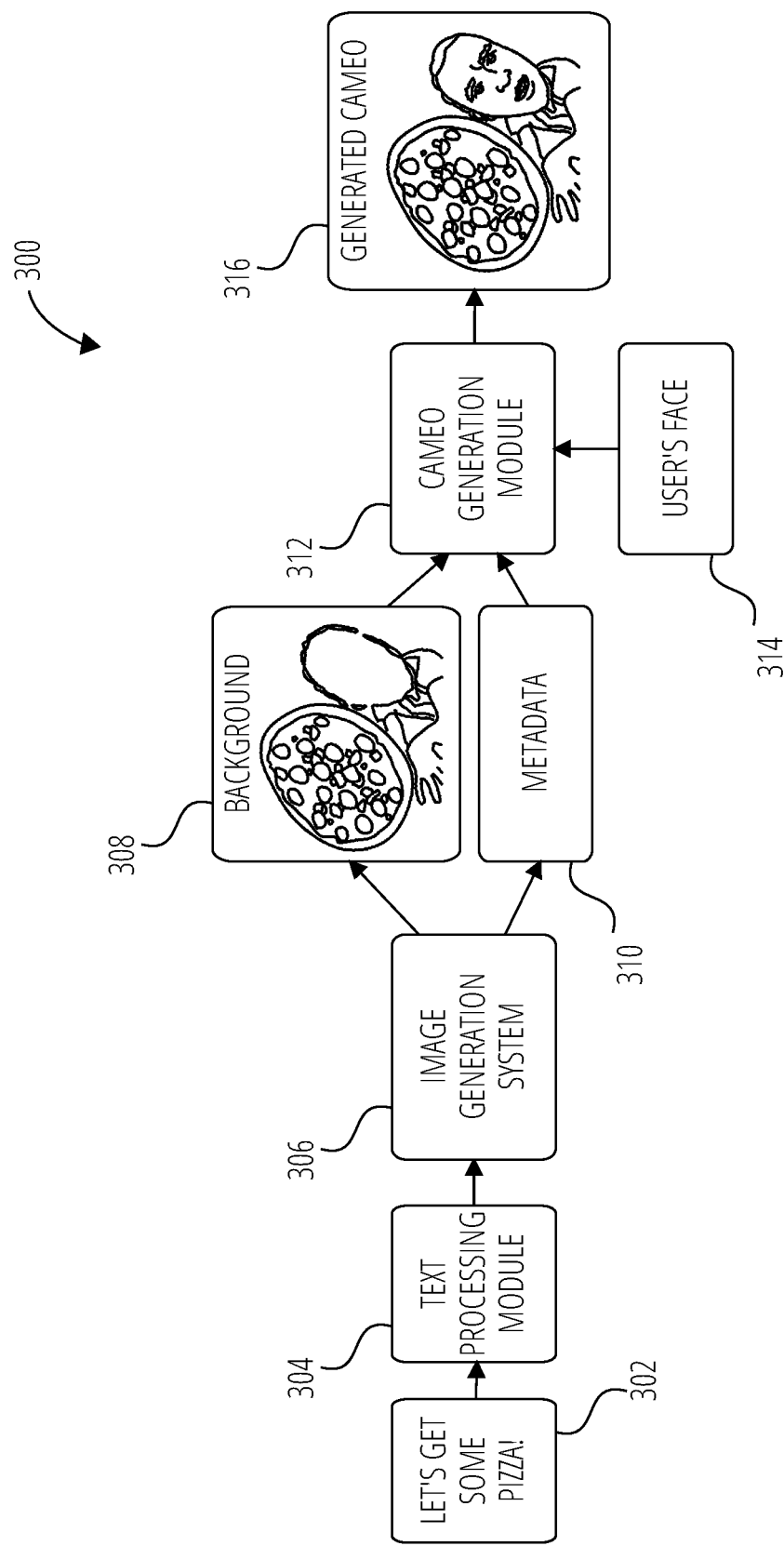
FIG. 3 illustrates a cameo generation system 300 according to some examples.

FIG. 3 illustrates a cameo generation system 300 according to some examples. The cameo generation system 300 includes a text processing module 304 that processes input text 302 to prepare it for use by an image generation system 306. The processed input text 302 is then provided as input to the image generation system 306, which operates on the processed input text 302 to generate a background 308 and associated metadata 310. The background 308, the metadata 310 and an image of the user's face 314 are provided as input to a cameo generation module 312, which generates a cameo 316 therefrom.

In some examples, the input text 302 is user input into a conversation starting or taking place in a message session in the messaging client 104 running on the user device 102. In other examples, the input text 302 may be input into a search bar for cameos, emojis, photos or videos.

Processing of the input text 302 in some examples running the input text 302 through a safety filter to determine whether the text includes unsuitable subject matter such as violent, hateful, or sexually suggestive language. If the input text is suitable, then the text processing module 304 expands the input text 302 using a creative caption function. The creative caption function is a natural language processing (NLP)-based function that generates creative captions from short queries. For example, a seed query like "love" may be expanded to "A boy holding a heart shaped balloon looking at the girl he loves." The creative caption function thus provides more interesting text input, which is nevertheless based on the original input text 302.

The expanded text is then altered by a text simplification function, to align the expanded text with text distributions that are known to work well with machine learning (ML) image generation models. The text simplification function takes the expanded text input and extracts key phrases. The extracted key phrases are then ranked, and the top one or two key phrases as ranked are cleaned. Text cleaning is a process whereby raw text is prepared for use by an ML model so that it can more effectively be used by the model. Text cleaning may for example include removing capitalization, punctuation and stop words.

Finally, the text processing module 304 may add specific text to the output of the text simplification function to refine the output of the ML image generation model. The added text may relate to the context in which the input text is used, such as "a person" or "a man" or "two women." The context may also be determined by NLP methods, as well as the identity or characteristics of the person entering the text or the intended recipient. For example, if two women are chatting in a messaging application, and the input text "Let's go get some pizza together" is received at one device, "two women" may be added, while if a man inputs "I'm craving some pizza!" in a group conversation, the text "one man" may be added. The added text may also relate to the intended style of the image to be generated, such as "photorealistic," for example, which will ensure that the generated image contains as little text as possible.

The processed input text 302 is then passed to the image generation system 306, which generates a background 308 for the cameo, as well as metadata 310 that defines at least the coordinates of the face in the background 308. The image generation system 306 in some examples is a Latent Diffusion Model (LDM), which is described in more detail below with reference to FIG. 5.

The background 308, the metadata 310 and the image of the user's face 314 are then provided to the cameo generation module 312, which adds the image of the user's face 314 to the background based on the metadata 310. As a final step, the user's face in the cameo 316 may be animated based on the sentiments of the user's input phrases.

Figure 4A:
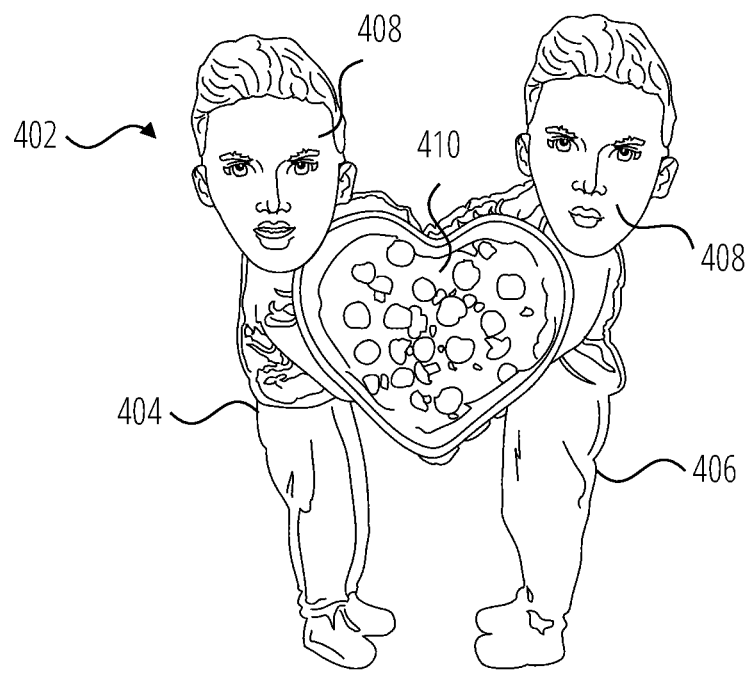
FIG. 4A and FIG. 4B are two examples of existing cameos that may be used in the generation of an ML model for use in the image generation system of FIG. 3.
Figure 4B:
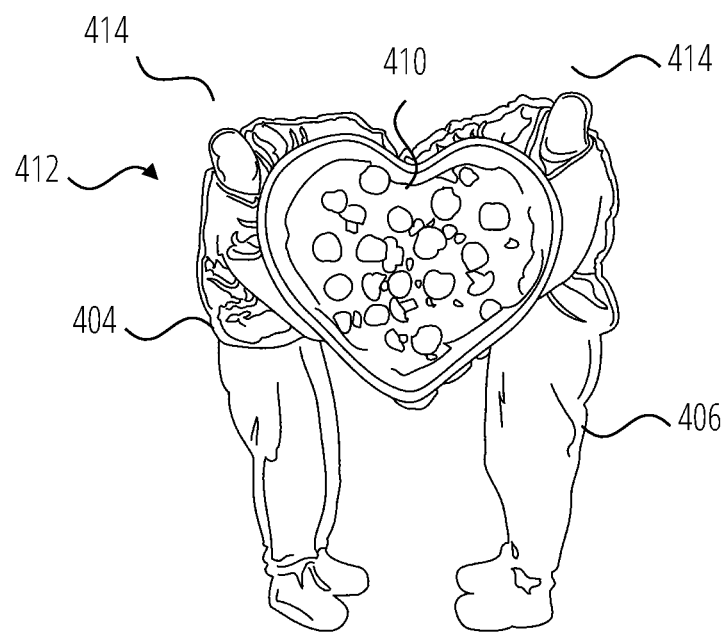

FIG. 4A and FIG. 4B are two examples of existing cameos 402, 412 that may be used in the generation of an ML model for use in the image generation system 306. Each of the cameos 402, 412 include a first FIG. 404 and a second FIG. 406. The FIGS. 404, 406 in FIG. 4A include generic male faces 408 used throughout the sticker collection as a male face, so that the characteristics of the face do not affect the training of the ML model.

The FIGS. 404, 406 in FIG. 4B include transparent faces 414. The transparent faces 414 each include a silhouette or outline (not shown in the figure). Use of a transparent face with a silhouette in training and refinement of the ML model results in the generation of similar facial silhouettes in the output from the ML model, from which face coordinates for use in adding a face or faces can be determined. As with the use of a generic face, use of a transparent face 414 also prevents characteristics of a particular face from affecting the training of the ML model.

The FIGS. 404, 406 are holding a heart-shaped pizza 410. Associated with the cameos 402, 412 are related tags, describing the contents of the cameo.

Figure 5:
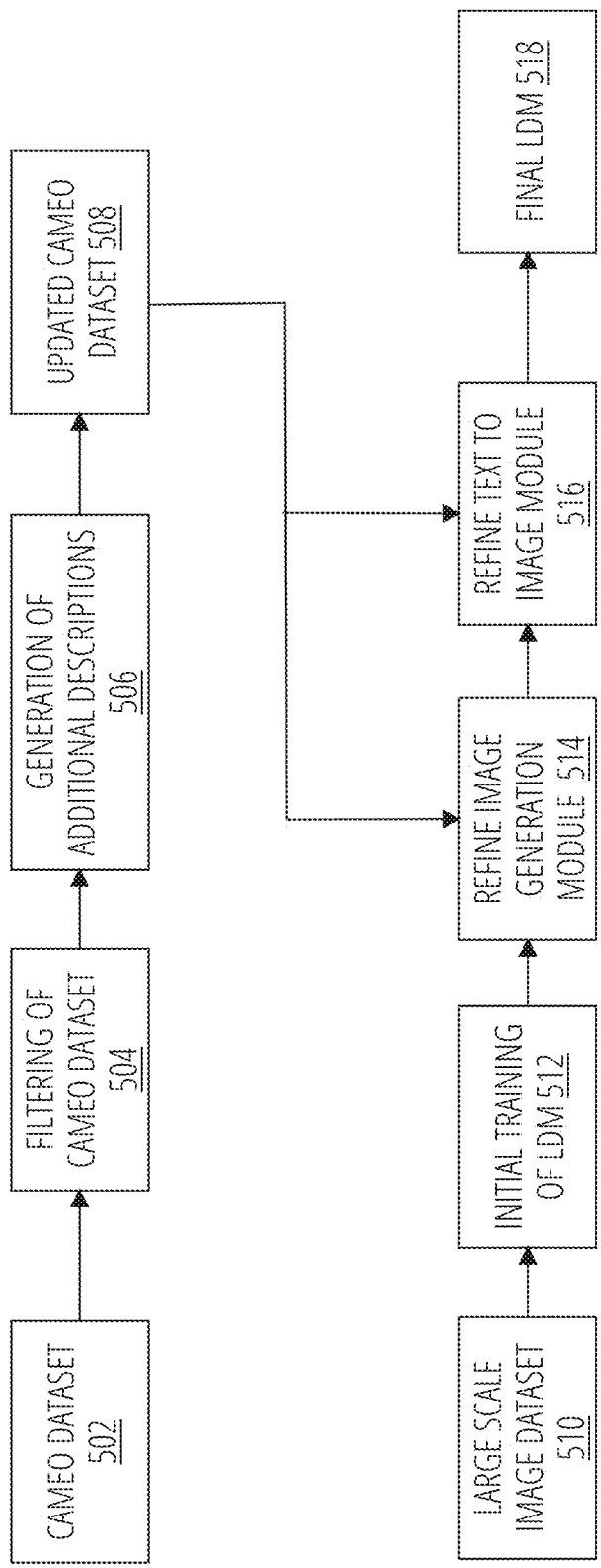
FIG. 5 is a schematic diagram illustrating the generation of a machine learning model used for generating cameo stickers, according to some examples.

FIG. 5 is a schematic diagram illustrating the generation of a machine learning model used for generating cameo stickers, according to some examples. The machine learning model is a text-to-image machine-learning model that converts input text to an image. In some examples, the text-to-image machine-learning mode is a Latent Diffusion Model (LDM).

Since it is desirable that the cameos that are generated using the techniques disclosed herein are somewhat similar in style and appearance to the cameos that are used in the current cameo system, an existing set of cameos, updated as below, is used to refine an initial LDM that has been trained using a large scale image database. Cameo 402 (or cameo 412) is one example of a cameo that is contemplated for use in refinement of the initial LDM, although it will be appreciated that many different types and styles of cameos can be provided, including photorealistic, artistic, abstract, line drawing, and so forth. Each cameo has associated annotated tags, including relevant descriptive text. For example, the cameos 402, 412 may have annotated tags such as "couple" and "love" and "pizza" and so forth. However, some of the existing tags associated with an existing set of cameos may be noisy, in that the tags may either be not relevant, or only peripherally relevant.

Accordingly, the tags of a current cameo dataset 502 comprising existing cameos are initially filtered in operation 504 for relevance of the tag to the corresponding cameo image, by using an image-text relevance model. In some examples, this filtering is performed using Contrastive Language-Image Pre-training (CLIP). CLIP is an image recognition and visual benchmarking system trained by using it to predict which caption from a random selection of captions is the correct one for a given image. CLIP learns to link a wide variety of objects with their names and the words that describe them, which permits it to identify objects in images outside its training set.

The CLIP model is used to match each cameo's current tags to the cameo image. If the matching score provided by the CLIP model for a particular tag is greater than 0.3, then the tag is kept, otherwise it is discarded. Example filtered tags using clip for the cameos 402, 412 are "heart pizza", "pizza", "pepperoni", "salami", and "hungry."

To supplement the filtered set of cameos and tags, further tags or captions are generated using an image-to-text module in operation 506, to provide more flexibility in the training of the LDM. This may be useful, for example, in cases where a user provides a more literal description of an intended or requested cameo. In some examples, the set of additional annotations are generated using a model known as Bootstrapping Language-Image Pre-training (BLIP). The BLIP model describes cameo 402 as "two people holding a heart shaped pizza."

The filtered tags from operation 504 and the additional descriptors generated in operation 506 are then combined with the cameo image data to create an updated cameo dataset 508, which is then provided as an input that is used to refine the LDM as will be described in more detail below.

The LDM is initially trained in operation 512 on a large scale image dataset 510 such as the LAION-400M dataset, which comprises 400 million English-language image and text pairs generated by crawling the web. The initial large scale dataset thus covers a multitude of topics and image styles. Initial training on this dataset provides the generalization capabilities that makes the proposed system better than traditional text search-and-retrieval systems for identifying and suggesting existing cameos for selection by a user.

The LDM is then fine-tuned in two steps, using the updated cameo dataset 508. The LDM includes an image-generation module such as VQGAN, which is a vector-quantized image-generation module. This model only requires the images from the updated cameo dataset 508 for finetuning. The cameo images are thus used in operation 514 to fine tune the image-generation module of the LDM.

The LDM also includes a text to image module, which may be a vector diffusion model in some examples. The text to image vector diffusion model, which has initially been trained on the image, text pairs in the large scale image dataset 510, is finetuned using the image and text pairs in the updated cameo dataset 508 in operation 516. The resulting final LDM 518 is then used in the cameo generation method discussed below.

Figure 6:
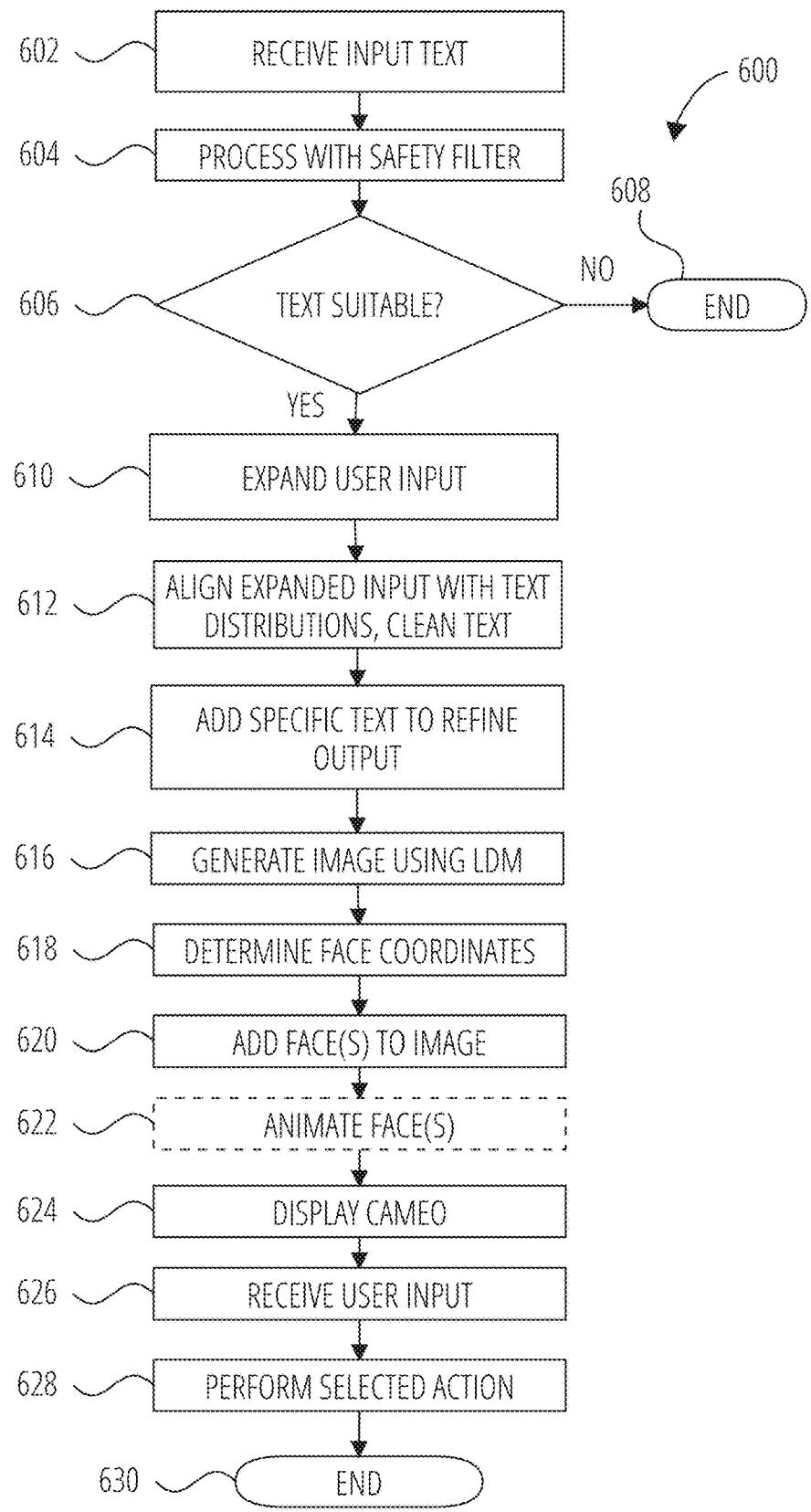
FIG. 6 is a flowchart 600 illustrating a method of generating cameo stickers according to some examples.

FIG. 6 is a flowchart 600 illustrating a method of generating cameo stickers according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations. Furthermore, while the operations in flowchart 600 are described with reference to a process running on a user device 102, the associated functionality may alternative be provided as part of a distributed processing system including one or more servers.

The flowchart commences at operation 602 with receipt of input text by the user device 102. In some examples, the input text is user input into a conversation starting or taking place in a message session in the messaging client 104 running on the user device 102. In other examples, the text may be input into a search input bar for cameos, emojis, photos or videos. In response to receiving input text, the messaging client 104 (or other application 106) on the user device 102 processes the input text with a safety filter in operation 604 to determine whether the text includes unsuitable subject matter such as violent, hateful, or sexually suggestive language. If the messaging client 104 determines in operation 606 that the text is not suitable, the flowchart 600 ends at operation 608, or alternatively returns to operation 602 for the receipt of further, potentially suitable text.

If the messaging client 104 determines that the text is suitable in operation 606, then the messaging client 104 processes the input text using a creative caption function to expand the input text in operation 610. The creative caption function is a natural language processing (NLP) based module that generates creative captions from short queries. For example, a seed query like "love" may be expanded to "A boy holding a heart shaped balloon looking at the girl he loves."

Some other examples may be expanding "Hi" to "A cat saying hi to a bird," "Angry" to "Angry sumo wrestler punching the ground" and "Please" to "A bear holding a please sign." The creative caption function thus provides more interesting text input, which is nevertheless based on the original text input, for use in text-to-image cameo generation as disclosed herein.

In operation 612, the expanded text from the creative caption function is then altered by a text simplification function running on the messaging client 104, to align the expanded text with text distributions that are known to work well with the LDM image generation model. The text simplification function takes the expanded text input and extracts key phrases. The extracted key phrases are then ranked by the messaging client 104, and the top one or two key phrases as ranked are cleaned. Text cleaning is a process whereby raw text is prepared for use by an ML model so that it can more effectively be used by the model. Text cleaning may for example include removing capitalization, punctuation and stop words.

In operation 614, specific text is then added to the output of the text simplification function to refine the output of the LDM. The added text may relate to the intended style of the image to be generated, such as "photorealistic" for example, which will also ensure that the generated image contains as little text as possible. As mentioned above, the added text may also relate to the context in which the input text is used, such as "a person" or "a man" or "two women." The context may also be determined by NLP methods, as well as the identity or characteristics of the person entering the text or the intended recipient.

The final text as received, generated and modified in operations 602 to 614 is then provided as input to the final LDM 518 in operation 616, which generates a cameo background.

In operation 618, the generated cameo background is then analyzed using known face recognition and characterization techniques to determine the coordinates of the face, including in some examples the size, location and orientation of the face(s) therein, as well as, in some further examples, the location of key facial features.

A face, or more than one face, such as the user's face, another conversation participant's face, a "friend" of the user, is/are added to the cameo background in operation 620 based on the coordinated determined in operation 618. In some examples, the face or faces may be animated using known face-animation techniques, in operation 622. In some examples, a face may be animated so that it speaks the input text, or text derived from the input text, such as "congratulations" for congratulatory input text, or an expression (sadness, happiness, surprise and so forth) derived from the input text.

The cameo is then displayed on a display of the user device in operation 624, and is available for user input in operation 626. The user input may include selection of the cameo to be used (transmitted) in the conversation taking place, forwarding, saving, dismissal and so forth. In operation 628, the selected action is taken by the messaging client 104, such as for example transmitting the generated cameo to the user device 102 of a remote recipient, via the messaging system 100. The method then ends in operation 630 or alternatively returns to operation 602 for the receipt of further input text.

In some examples, operations operation 610 to operation 620 may be run more than once, with or without variations in the input text, for example in the order of the words or with additional text that was previously discarded in the text ranking. A plurality of generated cameos can thus be provided for user review and selection. Still further, in addition to the generated cameo(s), the plurality of cameos may include cameos from an existing collection that have been retrieved by the messaging application 846 using text search-and-retrieve methods, operating on the original user input text or the expanded text generated by a text processing module 304.

Machine Architecture

Figure 7:
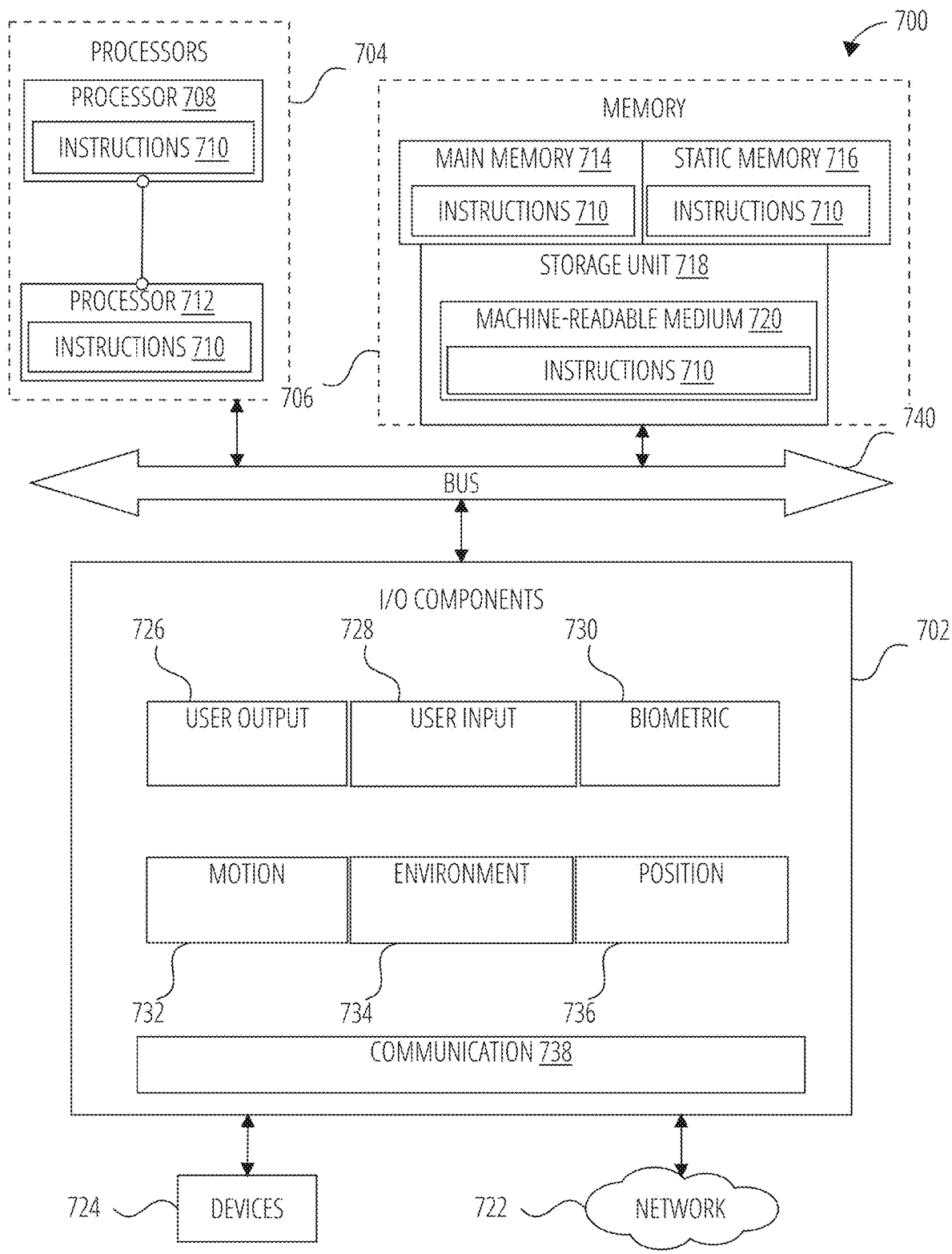
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the user device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output U/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
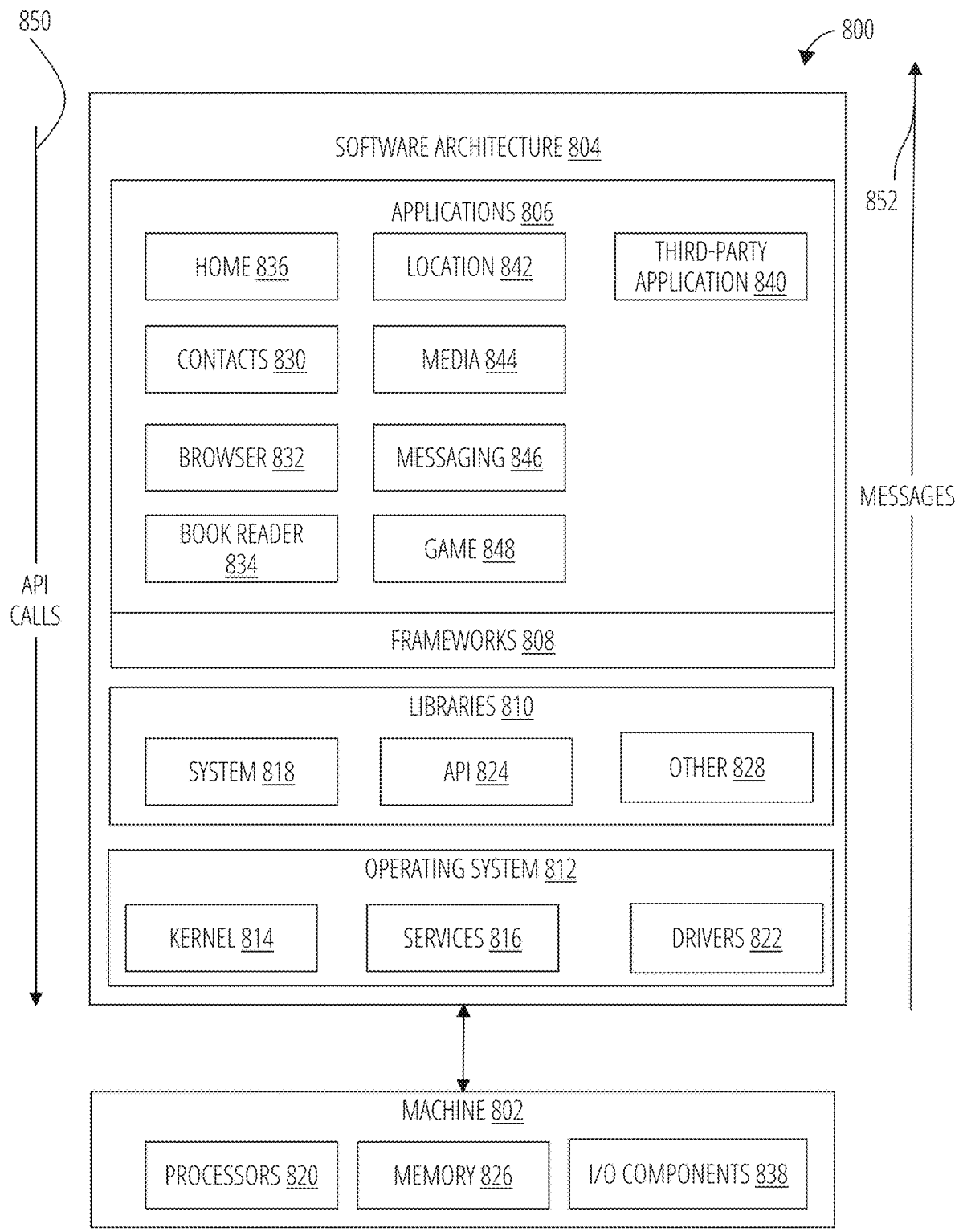
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"User device" refers to any machine that interfaces to a communications network to obtain resources from one or more server systems or other user devices. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data in a non-transitory manner. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A computer-implemented method of generating an image including an existing representation of a face of a person, for use in a conversation taking place in a messaging application, the method comprising:
receiving conversation input text from a user of a portable device that includes a display;
generating model input text from the conversation input text;
generating an image based on the model input text using a text-to-image model;
determining coordinates of a face in the generated image;
applying the existing representation of the face of the person to the generated image based on the coordinates of the face in the generated image, to generate an updated image including the existing representation of the face of the person;
displaying the updated image on the display of the portable device;
receiving user input to transmit the updated image in a message; and
transmitting, in response to receiving the user input, the updated image to a remote recipient.

2. The method of claim 1, wherein the generating of the model input text comprises generating additional text using a creative caption function.

3. The method of claim 2, wherein the generating of the model input text further comprises:
extracting key phrases from the additional text.

4. The method of claim 1, further comprising:
processing the conversation input text with a safety filter to determine suitability of the conversation input text for image generation.

5. The method of claim 1, wherein the text-to-image model has been generated from a large scale image dataset and refined by an existing collection of images for use in a conversation taking place in a messaging application.

6. The method of claim 5, wherein text associated with images in the existing collection of images is expanded using an image-to-text module.

7. The method of claim 5, further comprising:
animating the face of the person in the updated image.

8. A non-transitory computer-readable storage medium, the computer-readable storage medium including instructions that when executed by a computer, cause the computer to perform operations for generating an image including an existing representation of a face of a person, for use in a conversation taking place in a messaging application, the operations comprising:
receiving conversation input text from a user of a portable device that includes a display;
generating model input text from the conversation input text;
generating an image based on the model input text using a text-to-image model;
determining coordinates of a face in the generated image;
applying the existing representation of the face of the person to the generated image based on the coordinates of the face in the generated image, to generate an updated image including the existing representation of the face of the person;
displaying the updated image on the display of the portable device;
receiving user input to transmit the updated image in a message; and
transmitting, in response to receiving the user input, the updated image to a remote recipient.

9. The non-transitory computer-readable storage medium of claim 8, wherein the generating of the model input text comprises generating additional text using a creative caption function.

10. The non-transitory computer-readable storage medium of claim 9, wherein the generating of the model input text further comprises:
extracting key phrases from the additional text.

11. The non-transitory computer-readable storage medium of claim 8, wherein the operations further comprise:
processing the conversation input text with a safety filter to determine suitability of the conversation input text for image generation.

12. The non-transitory computer-readable storage medium of claim 8, wherein the text-to-image model has been generated from a large scale image dataset and refined by an existing collection of images for use in a conversation taking place in a messaging application.

13. The non-transitory computer-readable storage medium of claim 12, wherein text associated with images in the existing collection of images is expanded using an image-to-text module.

14. The non-transitory computer-readable storage medium of claim 13, wherein text associated with the images in the existing collection of images is filtered for relevance of the text to the images in the existing collection of images, by using an image-text relevance model.

15. A computing apparatus comprising:

a processor; and a memory storing instructions that, when executed by the processor, configure the apparatus to perform operations for generating an image including an existing representation of a face of a person, for use in a conversation taking place in a messaging application, the operations comprising:

receiving conversation input text from a user of a portable device that includes a display;

generating model input text from the conversation input text;

generating an image based on the model input text using a text-to-image model;

determining coordinates of a face in the generated image;

applying the existing representation of the face of the person to the generated image based on the coordinates of the face in the generated image, to generate an updated image including the existing representation of the face of the person;

displaying the updated image on the display of the portable device;

receiving user input to transmit the updated image in a message; and transmitting, in response to receiving the user input, the updated image to a remote recipient.

16. The computing apparatus of claim 15, wherein the generating of the model input text comprises generating additional text using a creative caption function.

17. The computing apparatus of claim 16, wherein the generating of the model input text further comprises:

extracting key phrases from the additional text.

18. The computing apparatus of claim 15, wherein the text-to-image model has been generated from a large scale image dataset and refined by an existing collection of images for use in a conversation taking place in a messaging application.

19. The computing apparatus of claim 18, wherein text associated with images in the existing collection of images is expanded using an image-to-text module.

20. The computing apparatus of claim 18, wherein text associated with the images in the existing collection of images is filtered for relevance of the text to the images in the existing collection of images, by using an image-text relevance model.

* * * * *